I. K. BEAVER.
NOZZLE.
APPLICATION FILED SEPT. 17, 1909.
971,516.
Patented Oct. 4, 1910.
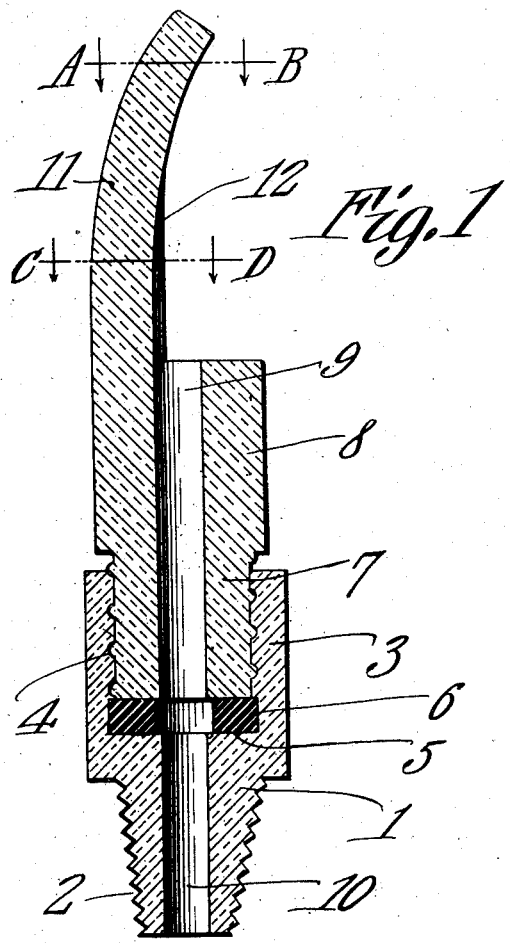
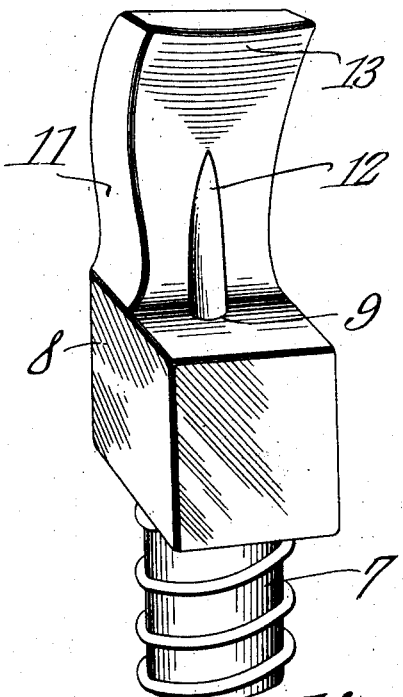
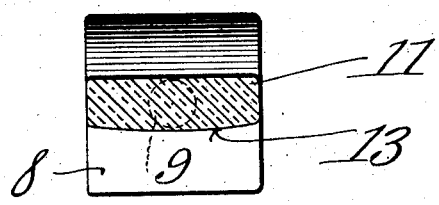
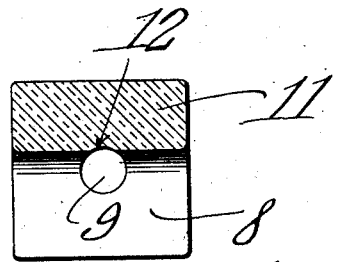

UNITED STATES PATENT OFFICE.

ISAAC K. BEAVER, OF WILBURTON, PENNSYLVANIA, ASSIGNOR OF ONE-HALF TO ELMER E. STRAUB, OF WILBURTON, PENNSYLVANIA.

NOZZLE.

971,516.  Specification of Letters Patent.  Patented Oct. 4, 1910.

Application filed September 17, 1909. Serial No. 518,207.

*To all whom it may concern:*

Be it known that I, ISAAC K. BEAVER, a citizen of the United States, residing at Wilburton, in the county of Columbia and State of Pennsylvania, have invented a new and useful Nozzle, of which the following is a specification.

This invention relates to nozzles for use in connection with hose and the like to produce a spray designed for washing coal, spraying lawns, sprinkling streets, extinguishing fires, and in fact wherever it is desirable to evenly distribute a sprayed liquid.

Another object is to provide a nozzle which will resist the action of acids passing therethrough and which is so constructed as to permit the passage therethrough of any sediment or other foreign substances without danger of clogging.

A still further object is to provide a device of this type particularly designed for use in connection with chemical fire extinguishers because a maximum area may be covered by the spray, this resulting from the widespread distribution of the liquid.

With these and other objects in view the invention consists of certain novel features of construction and combinations of parts hereinafter more fully described and pointed out in the claims.

In the accompanying drawings the preferred form of the invention has been shown.

In said drawings Figure 1 is a longitudinal section through the nozzle and the coupler used in connection therewith. Fig. 2 is a perspective view of the nozzle. Fig. 3 is a section on line A—B of Fig. 1. Fig. 4 is a section on line C—D of Fig. 1.

Referring to the figures by characters of reference, 1 designates a coupling member having a screw threaded tapered end portion 2 designed to engage a hose or other supply pipe and provided with a counter bored enlarged end portion 3 which is interiorly screw threaded as indicated at 4. An interior shoulder 5 is formed at the inner end of the counter bore and constitutes a seat for a gasket 6 of rubber or the like. This gasket is designed to be engaged by one end of a cylindrical stem 7 formed integral with and projecting from one end of an angular block 8 constituting the body of the nozzle. A passage 9 extends longitudinally through the block and stem and registers with a corresponding passage 10 formed longitudinally within the coupling 1. A tongue 11 extends from that end of the block 8 farthest removed from the stem 7, there being a longitudinal groove 12 formed within this tongue and registering with a portion of the passage 9 as clearly indicated in Figs. 1 and 2. The tongue 11 is slightly curved at its outer end so as to overhang the passage 9 and the groove 12 gradually diminishes in depth toward its curved portion and the wall of the groove gradually merges into the corresponding face of the tongue. That portion of the concave surface of the tongue between groove 12 and the free end of the tongue is convexed transversely as shown at 13 in Figs. 2 and 3.

In using the nozzle herein described, the stem 7 is placed in engagement with the counter bored portion of coupling 1. When liquid under pressure is directed through the passage 10 and into the passage 9 it will be discharged in a jet along the groove 12 and against the overhanging transversely convexed portion 13 of the tongue 11. The said jet will be thus spread laterally and deflected so as to form a substantially fan-like spray which will be evenly distributed over an extensive area. By holding the nozzle so as to cause tongue 11 to extend downwardly the spray can be directed with considerable force against an object or objects thereunder, this force varying in proportion to the distance of the nozzle from the object or objects to be washed. The device will be found specially useful therefore in washing coal, extinguishing fires etc., it being found that a comparatively small jet of fluid can be spread into a spray of considerable extent, this resulting in a considerable reduction in the amount of fluid necessary for spraying a predetermined area. By holding the nozzle so as to cause the tongue 11 to extend upwardly, the device can be used as an efficient lawn sprinkler and the like.

It is to be understood that either or both the coupling 1 and the nozzle can be made of glass, they being capable therefore of resisting to the utmost the action of acids such as found, for example, in chemical fire extinguishers.

By forming the body portion of the nozzle of an angular block, the same can be conveniently gripped by a wrench or the like for the purpose of placing the nozzle in or removing it from position within the coupling 1.

It is of course to be understood that various changes may be made in the construction and arrangement of the parts without departing from the spirit or sacrificing the advantages of the invention.

What is claimed is:—

1. A nozzle having a deflecting portion extending across the path of a jet of liquid discharged from the nozzle and provided with a transversely convexed face for contact with said liquid, there being a longitudinal groove extending from the orifice in the nozzle and merging into the convexed face of the deflecting portion.

2. A nozzle including a body having a longitudinal passage therethrough and a tongue extending from one end of the body and having a curved outer portion overhanging the passage and provided with a transversely convexed inner face, there being a longitudinal groove registering with the passage and merging into the convexed face of the tongue.

3. A nozzle including a body having a longitudinal passage therethrough, and a tongue extending from the body and having a curved outer end portion overhanging the passage, there being a longitudinal groove within the tongue and registering with a portion of the passage, the wall of the groove gradually merging into the inner surface of the curved portion of the tongue and said surface being transversely convexed between the groove and the free end of the tongue.

4. A nozzle including an angular body having a screw threaded stem upon one end thereof, there being a longitudinal passage within the stem and body, and a tongue extending from the other end of the body at one side of the passage, said tongue having a curved free end overhanging the passage, there being a longitudinal groove within the tongue and registering with a portion of the passage, the wall of the groove gradually merging into the adjoining face of the tongue and said face being transversely convexed between the groove and the free end of the tongue.

In testimony that I claim the foregoing as my own, I have hereto affixed my signature in the presence of two witnesses.

ISAAC K. BEAVER.

Witnesses:
   ABRAHAM BRASSINGTON,
   JOHN POLLIER.